United States Patent
Williams et al.

(10) Patent No.: US 7,054,753 B1
(45) Date of Patent: May 30, 2006

(54) METHOD OF LOCATING OIL AND GAS EXPLORATION PROSPECTS BY DATA VISUALIZATION AND ORGANIZATION

(76) Inventors: Ralph A. Williams, 107 N. Avenue C, Humble, TX (US) 77338; Mark C. Robinson, 8131 Teakwood Forest, Spring, TX (US) 77379

( * ) Notice: Subject to any disclaimer, the term of this patent is extended or adjusted under 35 U.S.C. 154(b) by 78 days.

(21) Appl. No.: 10/985,535

(22) Filed: Nov. 10, 2004

Related U.S. Application Data (60) Provisional application No. 60/481,646, filed on Nov. 14, 2003.

(51) Int. Cl.
*G01V 9/00* (2006.01)

(52) U.S. Cl. .......................... 702/13; 702/16

(58) Field of Classification Search .................. 702/6, 702/11, 12, 13, 16
See application file for complete search history.

(56) References Cited

U.S. PATENT DOCUMENTS

| | | | | |
|---|---|---|---|---|
| 5,966,672 A * | 10/1999 | Knupp | ........................ | 702/16 |
| 2003/0018437 A1* | 1/2003 | Stark | ........................ | 702/14 |
| 2003/0074139 A1* | 4/2003 | Poedjono | ........................ | 702/16 |

* cited by examiner

*Primary Examiner*—Donald McElheny, Jr.
(74) *Attorney, Agent, or Firm*—Daniel N. Lundeen; Lundeen & Dickinson, LLP (57) ABSTRACT

The present invention relates to a method of locating oil and gas exploration prospects. A digital model of each of the many geologic strata that compose a basin is created for all or a portion of a basin by digitizing well log data 100, collecting all digitized well log data in a data base, marking common geological time markers throughout the entire basin and visually displaying the basin in a number of useful views 380, 580 to permit the isolation or identification of oil and gas producing geological formations. This allows for the generation of oil and gas drilling prospects 600 through the extrapolation of productive depositional features into undrilled portions of the basin. The present invention expedites these processes and allows the available well log data to be viewed in ways not previously possible thereby greatly enabling oil and gas exploration and development in a basin.

24 Claims, 6 Drawing Sheets

OIL & GAS DECISION PROCESS

METHOD OF LOCATING OIL AND GAS EXPLORATION PROSPECTS BY DATA VISUALIZATION AND ORGANIZATION

This application claims the benefit of Provisional Application Ser. No. 60/481,646, filed Nov. 14, 2003.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

This application includes a computer program listing appendix (CPLA) submitted on compact disc, which is hereby incorporated herein by reference. The total number of compact discs submitted herewith including identical duplicates is two. The CD-R discs were created using Roxio™ Easy Media Creator™ 7.0 on Microsoft® Windows® XP Professional Service Pack 2. The files listed in the computer program listing appendix are as follows with D representing the drive letter of the CD-ROM drive used to read the enclosed

| Directory of D:\ | | | |
|---|---|---|---|
| Creation Date | Creation Time | File Size (Bytes) | File Name |
| Oct. 14, 2004 | 08:09 AM | 37,112 | CPLA.TXT |

BACKGROUND OF THE INVENTION

The present invention generally relates to oil and gas exploration techniques, and more particularly to an improved method of data visualization and organization of existing well logs and well log data to identify potential basin-wide depositional characteristics for further exploration and development.

The rocks below us represent a geologic history of the many depositional environments that produced the strata that comprise a basin. Oil and gas knowledge workers have utilized numerous methods for reconstructing the geologic past of a basin to more accurately locate reservoir quality strata. Additional methods have been developed to predict the existence of the hydrocarbons within potential reservoir rocks.

A geologic basin is comprised of hundreds of rock layers or strata (formations) deposited over geologic time that must be understood to predict the location of hydrocarbon bearing rock (reservoirs). Each formation must be analyzed in order to understand and identify the nature of the depositional environment active during its deposition. During a geologic time interval there will be many different types of sediments being deposited. For example, sandstones (a rock composed of sand-sized particles) will be deposited near the point where a river first enters a body of water while shales (a rock composed of very fine-grained particles) will be deposited away from the shorelines in the deeper waters of a basin. A geologic formation may be sandstone in one part of a basin and shale in another. Another important rock type found in basins is limestone, which is composed of calcium carbonate. The dominant rock type in an area of a basin is called a "facies." Identifying and mapping the change from one facies to another for a particular formation is extremely helpful in predicting the location of reservoir quality rock.

Exploration and development of oil and gas bearing strata in a basin requires the drilling of wells that may penetrate the basin commonly to depths of from 1000 to 29000 feet. Over time, as a basin is probed with many well bores, a large amount of data is generated. One of the data types collected that is used extensively by the present invention is the geophysical well log. These well logs are composed of analog and digital records created when a measuring device is lowered into a well bore and then raised to the surface, all the while recording various physical properties of the strata penetrated by the well bore. This set of records from the well logs will be referred to as "well log data" in the current invention. Well log data as used herein denotes a general term for any data within the well log or extracted from the well log via digitizing, resampling, extrapolation, interpolation, curve fitting etc.

Well logs measure both the induced and ambient electrical and nuclear responses of the strata and other petrophysical properties. Historically, an analog graphical plot was made of the well logs that have a vertical axis representing the depth of the well bore and one or more horizontal axes that represents the amplitude of the measured response. An example of a common well log is the "Gamma-Ray Log" (GR) that measures the natural radioactivity being given off by the minerals in the rocks that compose the strata. The greater the quantity of radioactive minerals in a strata the greater the measured GR response seen on the well log graphical plot. The GR log has proven to be very effective in identifying changes in the geologic strata within a basin.

The knowledge worker in the area of oil and gas development work uses the GR log and other logs for many purposes, including, but not limited to mapping geologic strata, selecting strata to perforate, estimating the original oil and gas in place for a reservoir, and evaluating reservoir quality. The present invention expedites these processes and allows the available well log data to be viewed in ways not previously possible thereby greatly enabling oil and gas exploration and development in a basin.

Identification of the depth at which a particular stratum is penetrated by a well bore is frequently performed using paper copies of well logs. This process is commonly called "correlation". The common practice today is for the knowledge worker to juxtapose from two to six well logs to correlate the strata in a local area of a basin. Considering that there are tens of thousands of wells drilled in most onshore basins, it is impractical to correlate the hundreds of strata in all wells in a basin without utilizing the present invention.

The present invention takes advantage of a computer's ability to graphically display large numbers of digital well logs simultaneously on a screen to greatly expedite the correlation process and facilitate the correlation of hundreds of strata in all wells in a basin.

Other data besides well logs can play an important role in identifying geologic facies and determining the reservoir characteristics of a given strata. Other data commonly used includes but are not limited to the production history of a well, the well tests, and the core data. The production history typically can include the quantities of oil, gas and water produced from each interval completed in a well. Well tests are records of the types and quantities of fluids recovered from a well bore. Core data record the properties observed or measured for rock recovered from the well bore. The present invention selectively utilizes these data types and any other important or relevant data available in conjunction with the well logs.

The process described in this invention can collect the key information from a plurality of wells in a geologic basin and convert the analog data to digital. Once digital, the oil and gas knowledge worker can interpret the data from many wells much faster than possible without the current invention. Amplification of the digital data is possible to accentuate key features from a given well. The digital data can also be displayed utilizing graphical computerized display tools in an infinite number of variations, which directly leads to an enhanced ability to visualize the strata and production characteristics of reservoirs in a basin.

SUMMARY OF INVENTION

The present invention is for a method of locating oil and gas drilling prospects utilizing an unprecedented quantity of digital well log data, well production histories, well test data, and any other relevant digital well data. The present invention is comprised of obtaining, then digitizing on a computer or other suitable digitizing apparatus, log data from a plurality of wells drilled in a desired oil and gas basin; then normalizing the log data from each well using a standardized scale; correlating each digitized well log to create a stratigraphic framework for the entire basin; and, identifying the observable depositional features and facies for each interval in each well. The invention also encompasses visually displaying a plurality of individual well logs to reveal consistent depositional characteristics of a cross-sectional area of a portion of the basin.

By displaying more data simultaneously this invention can enable the facies changes resulting in reservoir rock to be seen and geologic time events to be correlated basin wide. The stratigraphic framework described herein can be comprised of the interpreted intersections between key strata and well bores and stored in a database or other data correlation system that facilitates the management and correlation of the vast amounts of data to be used in the current invention. The stratigraphic framework created allows all data in the digital database to be queried by a single formation or contiguous group of formations thereby providing a method for discerning the geographical distribution of existing and potential reservoir rock in a basin.

The present invention also makes the creation of digital well log data significantly more efficient so that a greater percentage of the total available well logs in a basin can be converted to digital.

Once well logs are digital the recorded logs are normalized to a consistent standard so that the amount of effective reservoir rock for each stratum can be accurately calculated. The calculated quantity of reservoir rock is mapped to reveal the geographical distribution and nature of the depositional features present during that particular geologic interval of time. The type and shape of these features allow for a much more accurate projection of reservoir rock into undrilled areas of the basin, thereby creating drilling prospects.

The present invention includes a method for locating oil and gas drilling prospects that can include normalizing existing digitized well log data. The normalized digital well log data can be correlated to create a stratigraphic framework for an entire basin or some part thereof. The normalization can be performed manually or by an automated computer process. The invention can display a plurality of individual well logs together to reveal consistent depositional characteristics of strata in the entire basin or some part thereof. The plurality of individual well logs can be displayed to reveal consistent depositional characteristics of a cross-sectional area of the basin. Because the invention uses normalized digital well log data for most of its analysis, the oil and gas knowledge worker can amplify or demodulate the data to reveal additional geologic features and information that would not have been possible without the present invention.

If an oil and gas knowledge worker does not already have access to sufficient digital well log data, the oil and gas knowledge worker can optionally inventory the existing digital well log data and determine the most efficient set of data for digitization. The oil and gas knowledge worker can use the claimed inventive method to optionally digitize well log data to create additional digital well log data for normalizing and correlating.

In another embodiment of the invention, an alternate method for locating oil and gas drilling prospects is described. This embodiment comprises optionally selecting well logs to be scanned based on areas of commercial interest in a basin. The optionally selected well logs or all reasonably available and necessary well logs can be scanned to create raster images. The raster images can be saved as tagged image file format (TIFF) files. The raster images can be digitized to create digital well log data. The digital well log data can be normalized to a common scale. The normalized digitized well log data can be correlated to explicitly identify key hang markers in each depositional stratum. The correlation can be performed manually, via an automated computer process, or a combination thereof. The normalized digital well log data can be scaled to emphasize explicit hang markers across multiple well logs. Formation tops can be extracted to create a visual display of a formation surface. A truncation line can be created at the intersection of two formation surfaces for overlay on a visual display of stratigraphic maps.

If alternate depictions of the available data are desired, the oil and gas knowledge worker can optionally amplify or demodulate the normalized digital well log data to show additional geological information and features.

Another alternate depiction of the available data can be optionally created by calculating net sand data from normalized digital well log data using an iterative calculation process. The normalized digital well log data along with petrophysical data and core data can be optionally used to calculate facies data. A basin-wide sequence depositional features model can be created from the facies data and the net sand data. Basin-wide prospect/play maps for a given strata can optionally be calculated from the large-scale basin-wide depositional features model and basin-wide hydrocarbon production data.

DETAILED DESCRIPTION OF THE INVENTION

Figure 1:
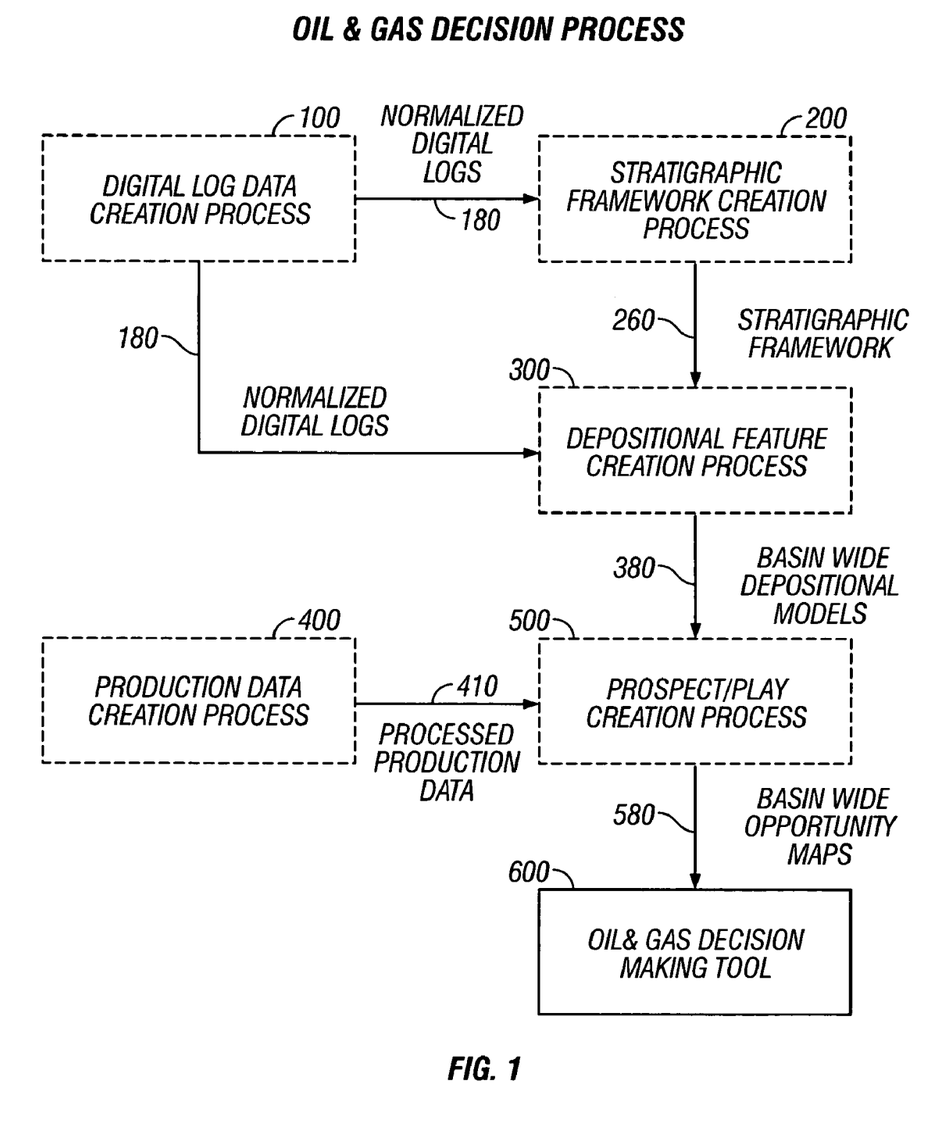
FIG. 1 is a schematic flow diagram of the entire method for locating oil and gas exploration prospects.

The utility of existing data for the exploration of oil and gas is well known in the industry. Large amounts of existing well logs and production reports are filed with regulatory agencies in each oil and gas producing state which may be surveyed or "mined" to obtain historical information useful for additional drilling in existing fields and in adjacent geographic areas. An overall schematic view of the current invention is shown in FIG. 1. The external data needed to commence the process of building the basin-wide map may be found in raster images of existing well-logs available both from public and private sources, existing digital well logs which normally must be purchased, the location of wells located on detailed geographic maps, scout information about existing well activity available both from public and private sources, production information which may be obtained from both private and public sources and other cartographic information showing boundaries, county lines and similar information.

The digital log data creation process 100 is the starting point for all analysis. The well logs, which are typically paper "hard copies" are scanned by conventional means well known to those in the industry, such as the Neuralog™ scanner by way of example only. Any other suitable scanner known in the industry will work equally as well. The scanning process begins with a list of wells to be scanned created from scout data sorted by standard field definition categories that may vary from state-to-state or governmental authority over the territory of the wells of interest. This list of wells is typically compiled by determining which specific well logs will provide the most information about the given basin such that every well log for a given basin may not need to be scanned to provide an accurate representation of the basin. The scanning process outputs digital image files called raster images. The raster images are typically in tagged image file format (TIFF). While this embodiment uses TIFF images by means of example, any digital image file format can be suitable depending on the scanning apparatus, software, and/or method utilized. The scanned TIFF files are indexed, typically with an API number (supplemented with an appended character to describe multiple images). The API number is merely a standardized number for the given oil or gas well. These scanned images are then archived in a database to permit their ready recall for subsequent use.

Although the well logs have been converted to a digital file format, the well logs still have not been digitized as the term is used in the present invention. The digitizing process consists of tracing the digital image file to determine the location of each data point on the plot and generating a table of data that represents the plot in digital form. This allows the oil and gas knowledge worker to easily manipulate the data.

The scanned logs are next digitized and loaded using appropriate software such as the commercially available software available under the trade designation FINDER or a similar program using a conventional utility program typically named ld_lg_load. While FINDER is disclosed as being used in this embodiment, any similar software can work equally as well. To accomplish this step, wells are then selected based upon geologic and geographic criteria using appropriate log suites and intervals. The selected well log raster images are loaded using appropriate software such as the commercially available software available under the trade designation DIDGER and the well log curve is traced for the first 200–300 feet. DIDGER is a suitable digitizing software package, but other digitizing software may be used. Stopping or continuation notes are written onto the image to assist the digitizer to complete the process.

Typically, approximately twenty prepared digitized files can conveniently be copied to a CD along with a spreadsheet that lists the well API number, the curve type, the start depth and the end depth. The CD is sent to the digitizer service. If copying files to a CD is not desirable, any other computer-readable digital media including, but not limited to removable hard drives, DVD discs, magnetic media, and the like can be utilized instead. Another possibility includes the transfer of the files over a standard computer network without removable media. The actual method of transferring the files is not critical to the claimed invention.

Once each set of wells (or the designated curve of each well) is traced the digitized image is then ready to be calibrated. After loading the digitized well log raster image into DIDGER, a standard calibration process can be used to provide a standardized value range for the well log data measure that was digitized. For example, the calibration process typically can include correcting the gamma ray or other measured curve values at each major increment such as every 100 feet of depth. This calibration step also permits the operator to inspect the well log to determine if errors have been incorporated into the log from the digitizing process and if necessary, to correct the errors. The calibrated curve can be exported to a Golden Software Boundary (GSB) formatted file and DIDGER can be used to resample the log at 0.5-foot intervals. Resampling as used herein describes the process of converting data that may have been collected at non-constant intervals to a set of data representing the same physical phenomenon but at constant intervals. Resampling is a very useful processing algorithm for many types of curve comparisons and makes subsequent analysis much easier. An LAS file can be exported from DIDGER providing an API well number and the well log curve. LAS refers to Log ASCII Standard, a file format commonly used in the oil and gas exploration industry.

The desired calibrated well logs are typically normalized using a PERL script that utilizes standard statistical techniques to determine mean and standard deviation of the data distribution. PERL is a stable, cross platform programming language. It is used for mission critical projects in the public and private sectors and is widely used to program web applications of all needs. Additional information about PERL can be obtained at http://www.perl.org. While a PERL script is used in this embodiment, the type of script or other software used is not a critical feature. Any suitable software code that performs the desired function can work equally as well. Normalization can typically include utilizing standardized statistical techniques to fit a curve to the digitized data points and to calculate the accuracy of the curve using standard deviations, means, and other standard statistical techniques well known in the art. Maximum and minimum curve values can be calculated and the curve fit in these normalizing values. The PERL script typically outputs the data in a FINDER compatible file format for further processing. Manual normalization can be accomplished using FINDER's Log Trace Manager utility in a manner well known to the industry. A special template can be created having equally spaced divisions to facilitate visual adjustment of the well log curve.

Referring again to FIG. 1, once the created digital log is normalized, it can be used as the primary information for the stratigraphic framework creation process 200. Once the array of well logs are digitized and normalized, they can be visually displayed to show the common depositional characteristics from the process of identifying these features 300. Since geological deposition proceeds over vast geographic areas and over millions of years, the correlation of related features in these well logs can only be appreciated if they are arranged side by side with the important depositional features aligned. Visual continuity and manipulation can include, for example, removing grid lines, forming a reverse resistivity log trace, removing depth track and superimposing multiple logs in a single track. These manipulative techniques thereby allow well log displays to fully describe common geological characteristics from one well log to others both adjacent and remote. It is preferred to utilize a single type of well log from each well to create a visually clear cross-section display that can facilitate geologic correlation. The preferred log in more recently drilled fields are gamma ray logs. While gamma ray logs are the preferred single-type well logs, other logs can work equally as well. Additionally, as technologies become more advanced and new types of measurement logs are utilized, the current invention can be used in conjunction with these new types of logs. The claimed invention does not require any specific type of well log, but the use of the same type of well log for all wells can facilitate accurate correlation.

Typically, the correlation step preferably employs no less than 30 but may use hundreds of wells to determine commonalities in the basin, for example 300 or more. While these numbers work well in most situations, these are based on previous experience and are not a requirement. Under the proper circumstances, fewer wells can be used. The addition of a greater number of wells can increase the accuracy but also increase the amount of work involved. Using more than 300 wells is not usually necessary, but is fully within the scope of the claimed invention. Normalization in the context of correlating well log data refers to the processing of multiple sets of digitized and calibrated well log data and amplifying, offsetting, attenuating, or performing some other standard mathematical technique to ensure that each set of digitized well log data is referenced to a common scale for an accurate comparison. A well log trace can be either amplified or suppressed (reverse amplification) to better visualize log characteristics. The digital nature of the well log makes this step readily available to the oil and gas knowledge worker. Additionally, the production data creation process 400 can provide processed production data. From this array of data from the basin-wide depositional models 380 and the captured production data from existing wells 410, a unified prospect/play profile can be isolated in the prospect creation block 500.

Finally, the oil and gas decision making tools 600 provide a means of intelligently assessing the prospect or play under consideration and can be used to define step-outs or new drilling opportunities within existing basins or in other remote areas adjacent to producing basins. As will be discussed hereafter, the decision making tools process 600 flows naturally from the large scale basin-wide depositional features mapping which is generated by this system, together with the basin-wide hydrocarbon production maps which are correlated with the depositional feature map and the basin-wide prospect or play maps for a given strata within a basin. The alignment of geological information with production zones creates a matrix of multiple prospect zones, which can be exploited, thereby greatly enhancing the value of existing well-by-well analysis previously found in oil and gas prospecting.

Common sources of this existing external data are paper logs that must be rasterized to create images of well logs. This process is described generally in FIG. 2. Prior to obtaining external well logs, an inventory of existing well log information can be compiled and displayed on a base map of the basin under examination. Having once inventoried and displayed the existing information, a coordinated effort can be mounted to obtain missing or sparse well log information to more clearly define the area of interest. Gathering this information along with the top and base of each log run available permits early cross-sectional grid planning for the entire basin and permits early cost estimates of the digitizing process to be made at the commencement of the project. The inventory of existing logs typically identifies the most commonly available log in the basin and assists in the determination of the most likely log type for correlation of existing and future information. The early identification or inventory of well data can also permit the identification of other available information such as core data at likely depositional strata points throughout the basin. By performing this process before digitizing well logs, a potential cost savings can be realized by only digitizing well logs that are actually necessary to adequately characterize the basin.

Figure 2:
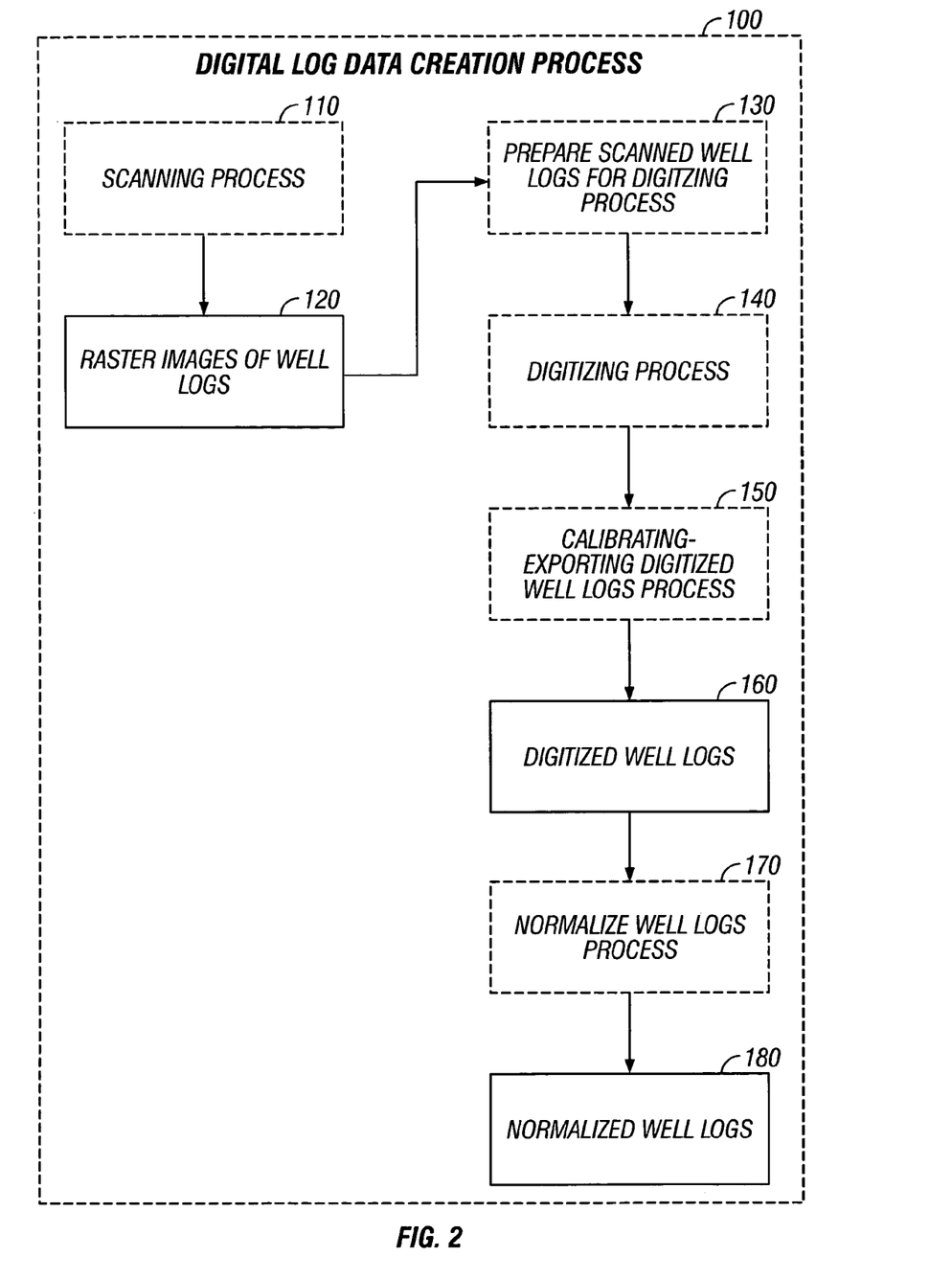
FIG. 2 is a schematic flow diagram of the digital log data creation process of the method described herein.

The digital log data creation process 100 commences with the acquisition of generally paper logs of wells within a defined geographic area. These paper logs can be acquired from a number of industry and governmental sources, such as the Texas Bureau of Economic Geology, the Oklahoma Geological Survey, Louisiana Department of Natural Resources, or private client files. The paper logs are then scanned using commercially available scanners, typically on-site 110. One group of scanners suitable for scanning paper logs into raster images includes a variety of commercially available scanners made by Neuralog, Inc., located in Stafford, Tex. The raster image 120 is the output from this scanning process. The raster images are typically tagged image file format (TIFF) files, but any other digital image form can be suitable. The raster image 120 is aggregated and put onto a CD to facilitate the transport of the voluminous data 130 in the digitizing process 140. Instead of copying files to CD, it is also feasible to copy the files to any other form of computer-readable digital media including, but not limited to removable hard drives, DVD discs, magnetic media, and so on. Another possibility is the transfer of the files over a standard computer network without having to use any form of removable media. The actual method of transferring the files is not critical to the claimed invention.

The raster well logs are then digitized in step 140. This can be accomplished either by hand input or by machine input, although applicant's experience with machine scanned input suggests that manual digitizing of the logs produces the highest and most accurate digital image of the paper log.

The scanning process 110 commences with the selection of wells to be scanned based upon areas of commercial interest in a given basin. Scout data can be obtained to provide information as to existing plans and activities in adjacent locations. Scanned raster files are then saved as graphic tiff images or other digital image files which can be indexed by the American Petroleum Institute (hereafter "API") number with an appended character to indicate whether multiple scans for the same well are to be entered. The desired wells can be selected based upon geological and geographic considerations. If a plurality of existing logs is available for a given location, the appropriate log suites and intervals are chosen for digitizing since they provide the most efficient source of information for correlation of the system.

The selected well log images can be loaded into a commercially available digitizing program and the well is traced for the first 200–300 feet of requested log trace. This 200–300 should not be construed as limiting as the actual distance will vary depending on the well being examined. The number can be greater or less than this range depending on the applicable circumstances. Stopping or continuation notes can be written on the image to assist the digitizer with the process. While there is no limit, approximately twenty prepared files are typically copied to a CD or transferred by other suitable means along with a spreadsheet that lists each well's API number, the curve type being provided, the start depth and the end depth. The number of files to transfer at a time is limited only by the type of medium used. The CD or other suitable transfer medium can be delivered to the digitizer who digitizes the complete trace for each well. All requested well log traces are typically digitized over their entire recorded length. Multiple logs of the same wells can be spliced to create a complete well log, and overlaps and blank intervals within wells may be eliminated if sufficient data are available. It is not required that every well log be digitized over the entire length. If it is desirable to only digitize a partial log to save time, the invention can still function as desired, but will have less data available. The digital well logs can be adjusted to reflect a common baseline making comparison easier.

Each digitized well log can be loaded into commercially available software, such as DIDGER, and reviewed and depth calibrated in step 150. Once the calibrated digital well image 160 is completed, the image can be transferred to a GSB (Golden Software Boundary) format file for use in a resampling program that rescans the file in half-foot intervals. While half-foot intervals are the typical interval used, this is not a requirement of the invention but represents the current industry standard. The invention can use any suitable interval. This file can be exported as an LAS (Log ASCII Standard) file named with the API number and the well log curve. Depending on the actual software program used, other file formats may be desirable. The software and file formats described herein are for example purposes only and are not critical to the claimed invention.

Normalizing of the well log information in step 170 can be accomplished utilizing a script or other suitable software that extracts the required well logs from their storage media and performs standard statistical techniques to determine the mean and standard deviation of the data distribution. The normalization process can remove "noise" from the measurements as well as "outlier" data. Noise refers to measurements in the data that were introduced by the analog electric transmission means for collecting the data or from any other means that distorts the measurement of the physical phenomenon being measured. Outlier data is data that is not believed to be accurate because it falls outside the normal statistical ranges for the data points. This outlier data can be removed to create more accurate normalized data. A minimum and maximum curve value is typically calculated and the well log is fit between these limits. The normalized well log 180 can be exported back to a database management system, such as the commercially available FINDER™ from Schlumberger Geoquest. FINDER can be used to manually normalize data utilizing the "Log Trace Manager" utility available as part of the suite of programs from that system. Finally, a special template is created which provides equally spaced divisions to facilitate visually adjusting the well log curve.

Figure 3:
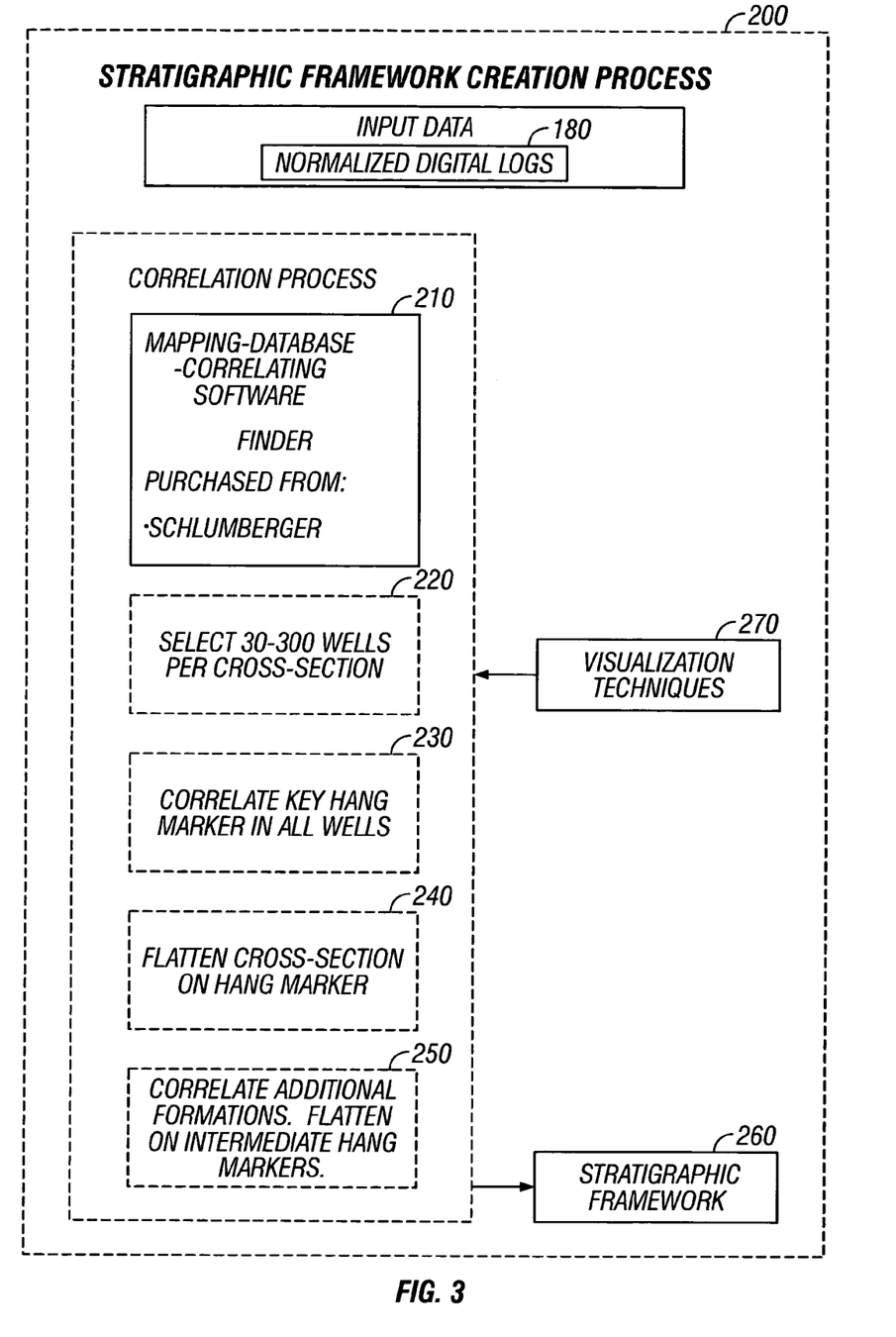
FIG. 3 is a schematic flow diagram of the stratigraphic framework creation process of the method described herein.

The visualization techniques in step 270 can include several components that facilitate the rest of the process such as visual continuity, one log correlation, amplification of log traces, and aspect ratio. The visual continuity element can include removing grid lines, reversing resistivity logs, removing the depth track, and superimposing multiple logs onto a single track. The one log correlation refers to a visualization technique where only one type of log is displayed for each well and many wells are displayed together for correlation. Typically GR logs are used in newer basins and SP logs are used in older basins, although this is not a requirement. The amplification of log traces can include amplifying or suppressing (demodulating) to better visualize the character of a given log. The amplification allows correlation of logs that could not be correlated using prior art technologies. The aspect ratio portion of the visualization techniques can include the ability to dynamically allow for various aspect ratios.

The digital normalized well logs 180 are the primary input to the stratigraphic framework creation process shown in FIG. 3. The digital normalized well log 180 can be loaded in commercially available software 210, such as Schlumberger's FINDER to map the wells against existing standard geographic maps. The commercially available software 210 typically results in the data and/or images being archived to a database for efficient management and retrieval at a later time. Having the data in a well-organized and easily manageable form is important, although a true database is not required. Any method of managing the files that is easily accessible to other software can be utilized and the term "database" is intended to include such possibilities. Normally between 30 and 300 wells are selected in step 220 for a given cross-sectional analysis of a basin. Choosing this number allows the operator to visualize broad overall trends that may otherwise be lost in viewing two or three adjacent wells. This number is not a requirement as long as the number of wells chosen is sufficient to provide an overall depiction of the basin. More wells can also be used, but more processing time will be required; 30–300 wells have worked well as a proper balance between these factors in the past. Once the ensemble of well logs are displayed together, key marker locations (i.e. changes in formation as reflected by log changes) are identified and marked 230 by positioning a cursor on the same key marker in each log. This permits the software to display each key marker at the same position for explicit horizontal comparison. The identification of basin-wide hang markers can allow debugging of the structure map for incorrect elevations, miss-spotted wells, logs loaded or associated with the wrong well and improper correlations. The choice of the hang marker is important since it forms the basis for stratigraphic cross-section correlations, which allow the basin-wide comparisons to be visualized.

Correlation of existing normalized digitized well logs can be done both manually and utilizing a computer process, which consists of nothing more than touching a given strata top to a corresponding top on an adjacent well log. This process often requires the use of the expertise of the knowledge worker, but can also be accomplished by automated computer algorithms designed to accomplish the step.

The remaining portions of the well profile are "flattened" in step 240 so that like markers (those defining the same geological formation) fall at the same position in each adjacent well profile. Additional markers can be identified and the process repeated until the full profile throughout the ensemble of wells is horizontally consistent. This iterative process allows the entire well log ensemble to be correlated in step 250 and made consistent for each geological deposition layer and provides the basis for all other analysis conducted on the well log data set.

Visual continuity of the digital data can be achieved by removing all grid lines, reversing resistivity logs, removing depth tracks from existing logs which may provide false or misleading correlations, and superimposing multiple tracks within a single log. A visual display can depict each well log type in a unique color to facilitate identification.

The important step of making a one-log correlation of the entire basin follows. The "one-log" criterion makes the comparison of widely disparate well log information useful. As noted herein, Gamma Ray (GR) logs are the most useful and common logs to use in the "one-log" step, but others can be used. For example, Spontaneous Potential (SP) logs normally found in older basins can be used to create a "one-log" map of the entire basin. Since each type of log has been digitized and normalized, the logs can be amplified or demodulated to show geological information not previously possible. Additionally, the aspect ratio of the visual image can be dynamically modified to show characteristics not otherwise readily apparent.

The building of a digital well file for the entire basin consolidates all versions of well files allowing a complete chronological history of each to be accessed from the computer database. This information accumulates the results of swab tests, drill stem testing, recompletions, production logs, types of casing and depths, plug-back information, squeeze tests, potential tests (4-point etc.), mud logs, pressure transient tests, paleontology data, source rock information, natural fracture data, injection tracer information, mud weight profiles, artificial lift, lost circulation data, abandonment, thin sections, petrophysical well log analysis results, and PVT (pressure, volume, and temperature) data. The wealth of information available for any given well often is overwhelming when aggregated with hundreds or thousands of wells in an existing basin. With the present invention, once a given depositional strata is identified and visualized, all well information for existing wells in the same strata can be readily examined by the knowledge worker using the visualization techniques in step 270. Information such as all wells within a given geographic area with paleo data in a given stratigraphic zone can be retrieved and examined. The location and the depositional layer of production data for each well are critical to the utility of the present mapping system.

The stratigraphic framework 260 acquired from this system shows the entire basin in a coordinated, geological correlated manner and forms the basis for all analysis that is described below. The displays of the analysis described below can be generated using visualization techniques in step 270. The visualization of basin-wide hang markers and common depositional characteristics will permit a knowledge worker to make timely assessments of new drilling prospects and reworking prospects for old or previously explored areas and the visualizing of all or substantially all major geological sequence boundaries in conjunction with production information. This step will often confirm on-screen correlations of micro-stratigraphic markers not discernable using existing methods of well log interpretation and correlation. Obviously, if a major sequence is totally non-productive, additional consideration of the micro-stratigraphic markers can be avoided and other strata explored.

Figure 4:
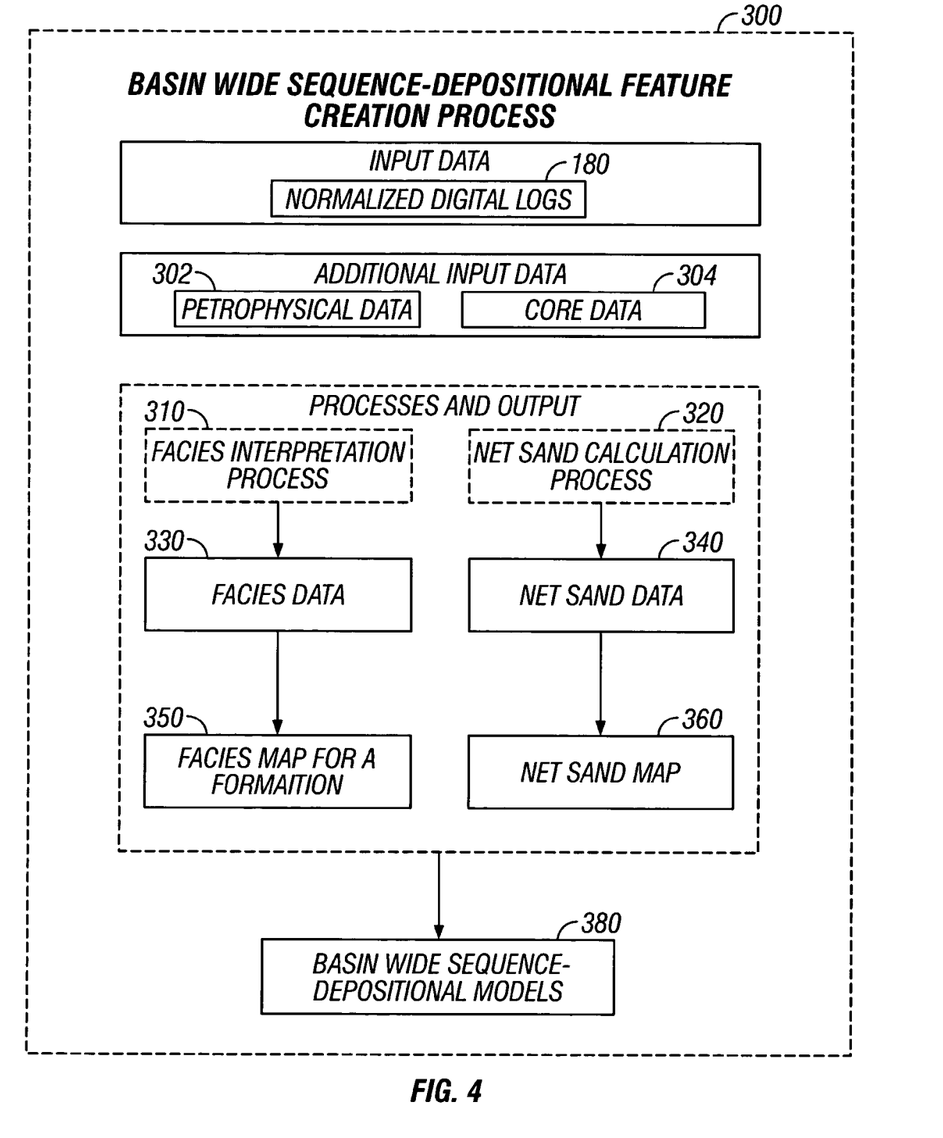
FIG. 4 is a schematic flow diagram of the basin-wide sequence-depositional feature creation process.

FIG. 4 describes the basin-wide sequence-depositional feature process 300. This process of two sub-processes: the facies interpretation process 310 and the net sand calculation process 320. A facies is a description of the part of a bed of sedimentary rock that differs significantly from other parts of the bed. Using the normalized digital logs 180 previously created, and correlating this data with petrophysical data 302 and core data 304, facies data 330 and net sand data 340 can be calculated. Petrophysical data 302 can be obtained from public and private sources or created from the well logs on each well in a given basin and assigned the unique API well number, which associates the logging date, the top depth and the bottom depth, together with the interpretation associated with the data to a particular well under study. Core data 304 from core samples is also frequently available from public and private sources and similarly assigned an API number, top depth, bottom depth, permeability, porosity, water saturation, lithology, and so on. Once the facies data 330 and the net sand data 340 are calculated, a facies map 350 and a net sand map 360 can be plotted, each of which shows the boundary of a given strata or production volume on a field or basin-wide map. The facies map 350 is one correlating well-log characteristics with a surface map. Net sand maps 360 show the contours of producing zones on a surface map. Each type of map has been used by those skilled in the art and each has long been accepted as a standard tool. Prior to the present invention, the facies maps 350 and net sand maps 360 were not created from the digital output of a database program, which permits efficient examination of new prospects or plays. Net sand isopachs (not shown) may similarly be generated either by hand or by computer means with existing software packages available in the market place and well known to those skilled in the exploration industry. It is important to use the normalized well logs from the existing system to permit useful interpretation when producing the net sand isopachs with the current system. This permits comparison across the entire basin of the net sand contours. Since the information is captured digitally, three-dimensional net sand maps 350 can be readily generated to allow easy visualization of existing pay zones and prospective areas. Productive wells for specific geological strata tend to cluster along a geological trend which the present inventive method can rapidly and efficiently visualize. The current method allows production data to be accurately assigned to the actual stratigraphic interval regardless of the historically assigned formation names. This is an extremely valuable tool in understanding the productivity of strata within a basin.

Decline curve information is also important to capture in a consistent and correlated manner in the present system. This information permits detailed basin-wide estimates of well bore work for existing wells and may be used to carve up production into specific completion and recompletion intervals.

Displaying well production as bubbles on the facies map 350 can allow for the rapid identification of the relationship between facies and production. The net sand calculation 320 discloses the total footage of the normalized digital well log data 180 that has a value greater than or less than a desired cut-off between a lower and an upper formation. The net sand calculation process 320 allows the normalized digital well log data 180 to be selectively summarized for a given strata thereby isolating the examination of the potential production from prior known production from this production zone. API well number, formation, top depth, bottom depth and the net footage can summarize the net sand data 340. The usefulness of an iterative net sand calculation cannot be underestimated. Since the well log and other production data are digital and correlated by well and geological formation, the net sand calculation process 320 can be run iteratively to determine the sensitivity of the formation to differing assumptions. The model and map 360 which emerge from this iterative process can represent the best estimate of the likelihood of production from a given strata available to the oil and gas explorationist today. When the net sand maps 360, the facies maps for multiple formations 350, and any other optional maps such as net sand isopachs are combined, the result is the Basin-Wide Sequence Depositional Models 380.

Figure 5:
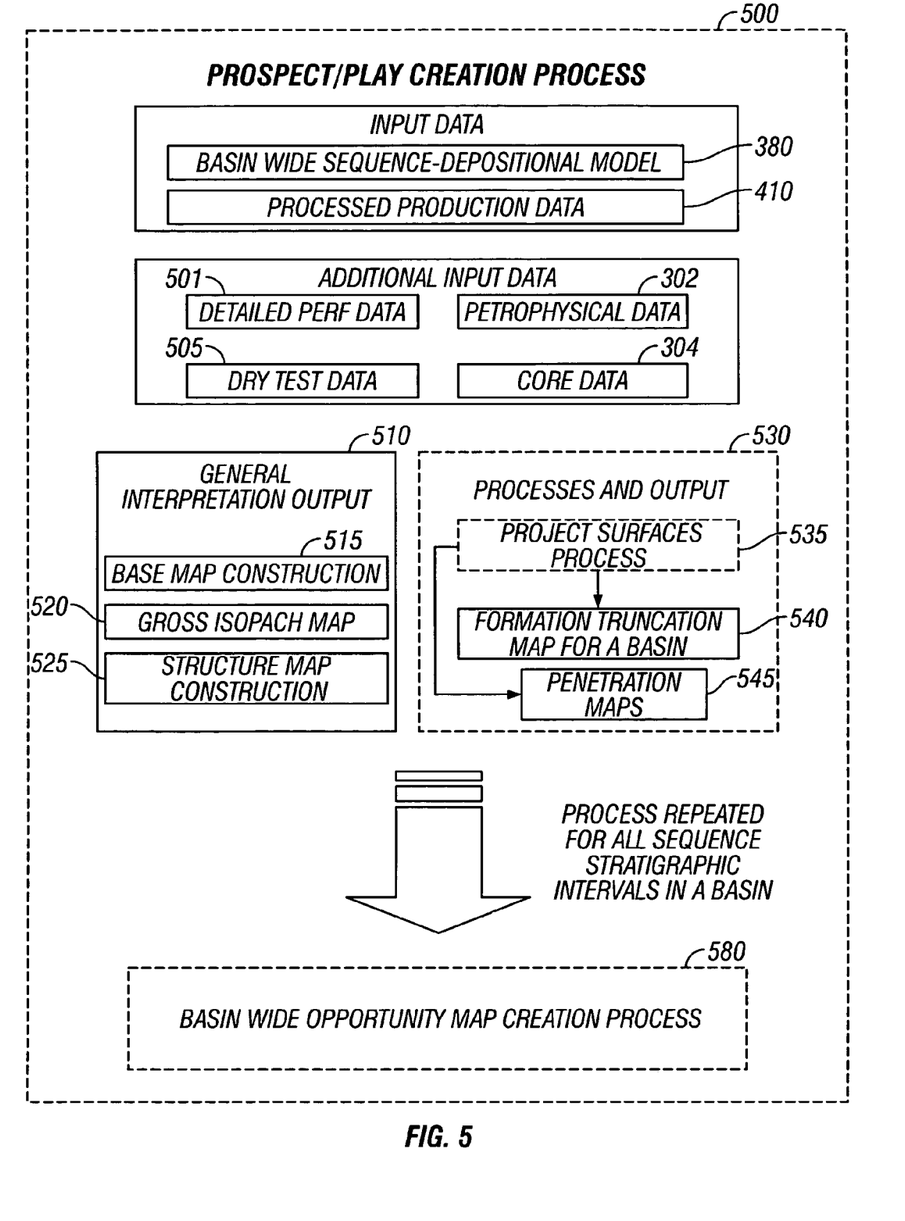
FIG. 5 is a schematic flow diagram of the prospect or play creation process of the method described herein.

FIG. 5 describes the prospect/play creation process 500 shown on FIG. 1. The inputs are the basin-wide sequence-depositional model process 380 and processed production data 410. Additional input data can include detailed perforation data 501, dry test data 505, petrophysical data 302, and core data 304. Each data set may be entered using the standard API well number format to associate each data set with a given well in the data base.

A map can be created for the petrophysical data 302 that also shows contours which can be used to create 4-D petrophysical maps of the basin. These contours can be differentiated by logging date to show the movement of water ingress or the hydrocarbon column for the basin at the given location. A GPD (Graphical Product Definition) can be developed to display the petrophysical interpretation on a cross-section adjacent to the relevant producing zone or strata.

Core data 304 can also be captured and utilized by the present invention. The present invention creates a custom table to store the interpreted results of the core analysis and the presence of cores. Data elements in this table can include: the API well number, the top depth and the bottom depth, the permeability, the porosity, the water saturation and lithology reflected from the core samples.

The General Interpretation Output 510 from the computer from this data is a base map 515 showing the entire basin wide map, with gross isopach 520 and primary structures 525 of the various strata of the basin. The use of the computerized data accumulated during the foregoing processes allows the knowledge worker to develop reservoir visualization processes and output 530. The processes and output starts with the project surfaces process output 535 and generates new data and maps including a formation truncation map 540 for the basin under study. This truncation map 540 is a stratigraphic map of the entire basin showing each likely production strata and the surface depth for each part of the basin where the strata either overlaps or is truncated, indicating where oil and gas prospects are likely to be found. Another map that can be produced if desired is the penetration map 545. The penetration map 545 depicts multiple wells and how far they have penetrated into the basin. With this information at hand, the explorationist or knowledge worker can assess and plan a step-out from the existing field or the continued development of alternative areas within a known geological formation. The result of the process/play creation process 500 is the Basin-Wide Opportunity Maps 580.

Figure 6:
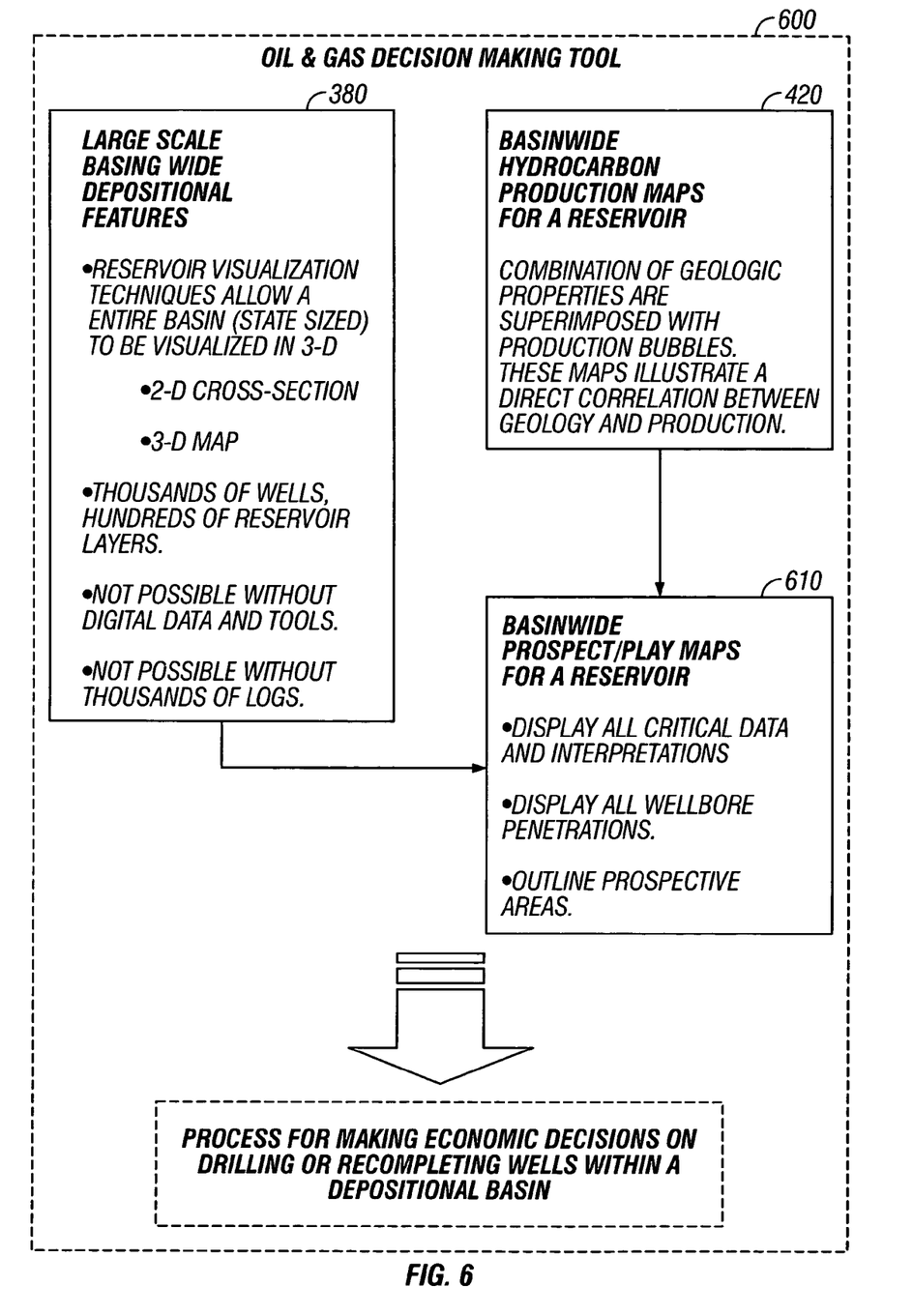
FIG. 6 is a schematic flow diagram of the decision-making tree of the method described herein.

FIG. 6 describes the final module of the present invention, the oil and gas decision-making process 600. The large-scale basin-wide depositional features 380 identified in the sequence-depositional feature creation process 300 can be an input. The large-scaled basin-wide depositional features 380 provide a basin-wide 2 or 3 dimensional map of an entire basin which may incorporate thousands of wells and which may cover hundreds of reservoir layers or strata. The basin-wide maps 380 correlate this data with basin-wide hydrocarbon production maps 420 which are supplied from digital information obtained from state, federal and private sources. The production maps 420 are shown in bubble map iso-production zones, which correlate geology with known production. Once all of the pieces of this puzzle are consolidated in the basin-wide prospect/play map 610, all or substantially all critical data and interpretations, all or substantially all well bore penetrations and an outline of prospective areas for study and/or further development are outlined. Each of the respective strata of likely production can be shown as a three-dimensional map of the basin or may be loaded into a matrix of values for further analysis and comparison with other prospects and with various pay zones of potential recovery. The usefulness of prior art technologies is limited, as they do not allow the comprehensive summary and comparison of existing data as in the invention described herein. This invention allows data to be created, correlated and compared within a short timescale to allow for presentation of processed data to managers or senior knowledge workers who may finally use their judgment to extend exploration to new areas of interest. It also allows extrapolation of existing well data to assess likelihood of existence of petroleum deposits in adjacent strata or other parts of the basin analyzed by this invention.

Although the description above contains many specifics, these should not be construed as limiting the scope of the invention but as merely providing illustrations of some of the presently preferred embodiments of this invention coming within the spirit and scope of the present invention that is limited only by the accompanying claims. It is especially important to note that the software packages and file types described and used herein are not required software packages or file types. Any suitable software package or file type that performs a similar function is suitable for using the current invention.

The Computer Program Listing Appendix submitted herewith lists the software code for various examples of programs that can be used with commercially available software for carrying out the invention.

The invention claimed is:

1. A method of locating oil and gas drilling prospects comprising:
normalizing digitized well log data;
correlating the normalized digitized well log data to an identified geographic basin map to create a stratigraphic framework for an entire basin; and
marking observable depositional features for each well using a standardized scale.

2. The method of claim 1 further comprising visually displaying a plurality of individual well logs to indicate consistent depositional characteristics of the basin.

3. The method of claim 1 further comprising visually displaying a plurality of individual well logs to show consistent depositional characteristics of a cross-sectional area of the basin.

4. The method of claim 1 wherein the correlation is manual.

5. The method of claim 1 wherein the correlation is automated.

6. The method of claim 1 wherein the normalized digital well log data are amplified or demodulated to show additional well information.

7. The method of claim 1 further comprising digitizing well log data to create the digitized well log data.

8. The method of claim 1 further comprising calibrating the digital well log data prior to the normalization.

9. The method of claim 8 further comprising saving the calibrated digital well log data as an LAS file.

10. The method of claim 9 further comprising inventorying well log data prior to the digitizing.

11. A method of locating oil and gas drilling prospects comprising:

scanning a plurality of well logs to create raster images;
digitizing the raster images to create digitized well log data;
normalizing the digitized well log data to remove outlier data or noise from a data recording process;
correlating the normalized digitized well log data to identify key hang markers in each depositional stratum;
scaling the normalized digitized well log data to emphasize hang markers across multiple well logs;
extracting formation tops to create visual display of formation surface;
adjusting non-conforming stratigraphic features to adjust formation surface mapping for visual display; and
utilizing intersect surfaces of non-conformity surface with formation surface to create a truncation line for overlay on a visual display of stratigraphic maps.

12. The method of claim 11 further comprising calibrating the digital well log data to a common scale prior to the normalization.

13. The method of claim 11 further comprising selecting the well logs for the scanning based on areas of interest in a basin.

14. The method of claim 11 wherein the normalized digital well log data are amplified or demodulated to show additional well information.

15. The method of claim 11 wherein the correlation is manual.

16. The method of claim 11 wherein the correlation is automated.

17. The method of claim 11 wherein the digital well log data and normalized digital well log data are stored in a database.

18. The method of claim 11 further comprising calculating net sand data from normalized digital well log data using an iterative calculation process.

19. The method of claim 11 further comprising calculating facies data from normalized digital well log data.

20. The method of claim 18 further comprising calculating facies data from normalized digital well log data.

21. The method of claim 20 further comprising generating a basin-wide sequence depositional features model from the facies data and net sand data.

22. The method of claim 21 further comprising generating basin-wide prospect/play maps for a reservoir from the basin-wide depositional features model and basin-wide hydrocarbon production data.

23. The method of claim 22 further comprising identifying suspected hydrocarbon bearing formations from the prospect/play maps.

24. The method of claim 23 further comprising drilling a well into a suspected hydrocarbon bearing formation identified in the prospect/play maps.

* * * * *